Jan. 6, 1953   R. O. SCOFIELD ET AL   2,624,518
STATOR WINDING MACHINE
Filed Oct. 5, 1946   14 Sheets-Sheet 1

INVENTORS
Robert O. Scofield
Herbert C. Schryver
by Spencer Hardman
and Fehr
their attorneys

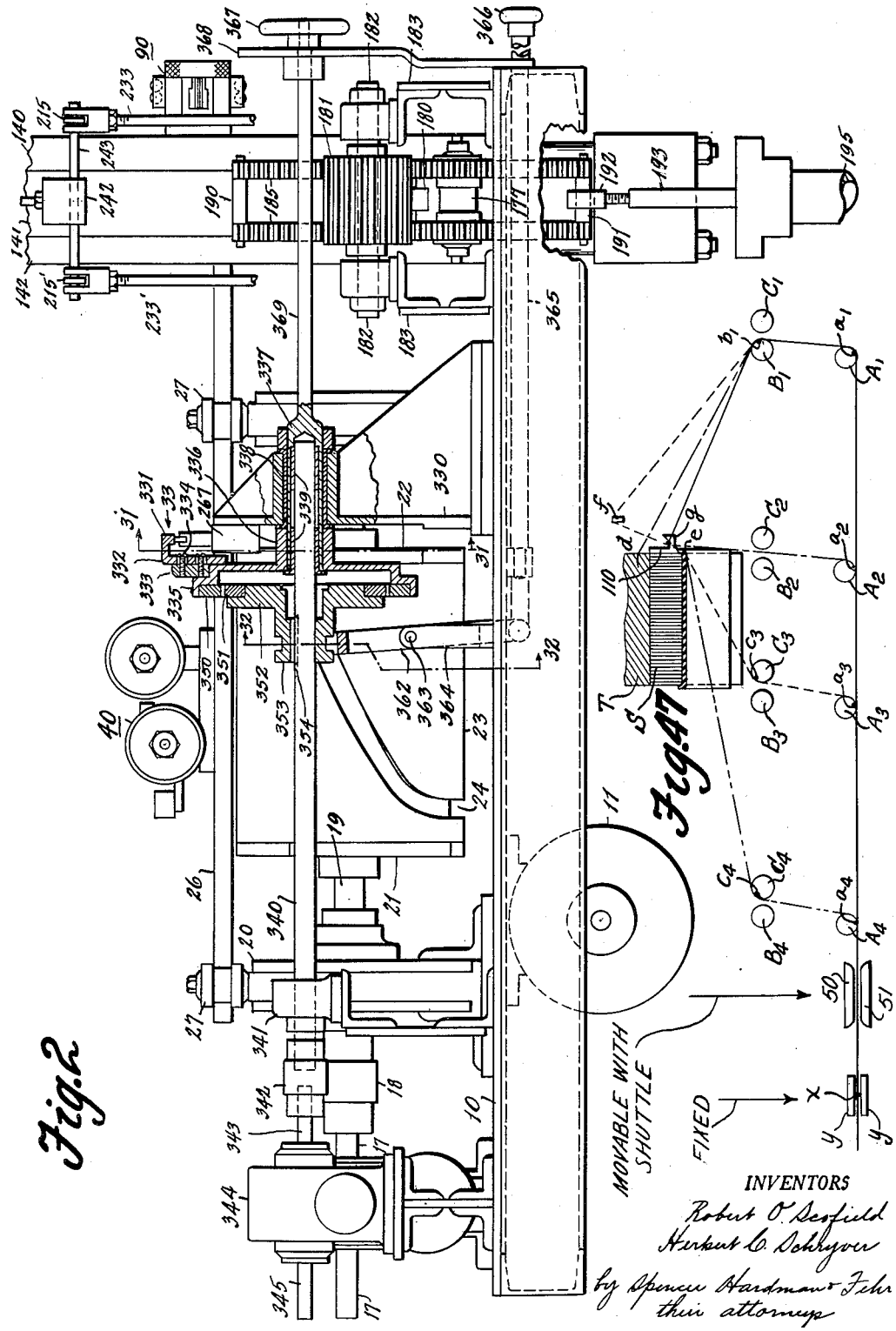

Jan. 6, 1953  R. O. SCOFIELD ET AL  2,624,518
STATOR WINDING MACHINE
Filed Oct. 5, 1946  14 Sheets-Sheet 3
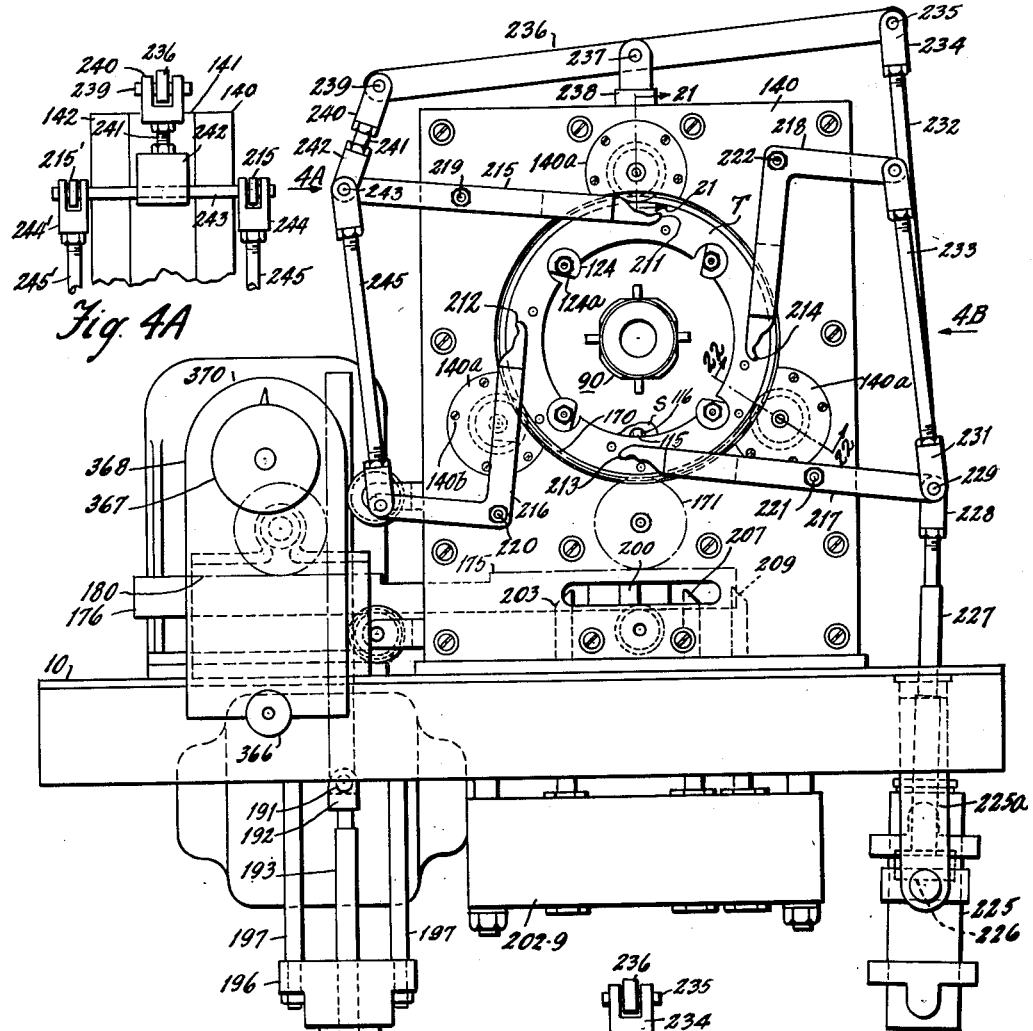
Fig. 4A
Fig. 3
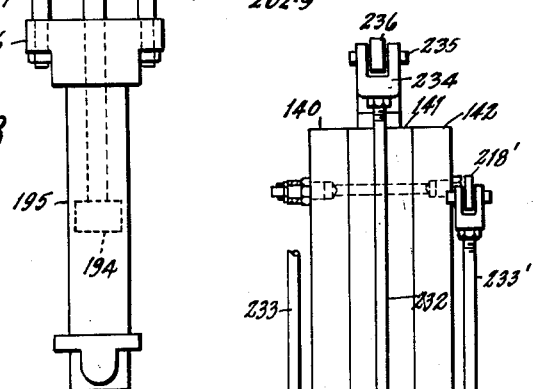
Fig. 4B
INVENTORS
Robert O. Scofield
Herbert C. Schryver
by Spencer Hardman Fisher
their attorneys

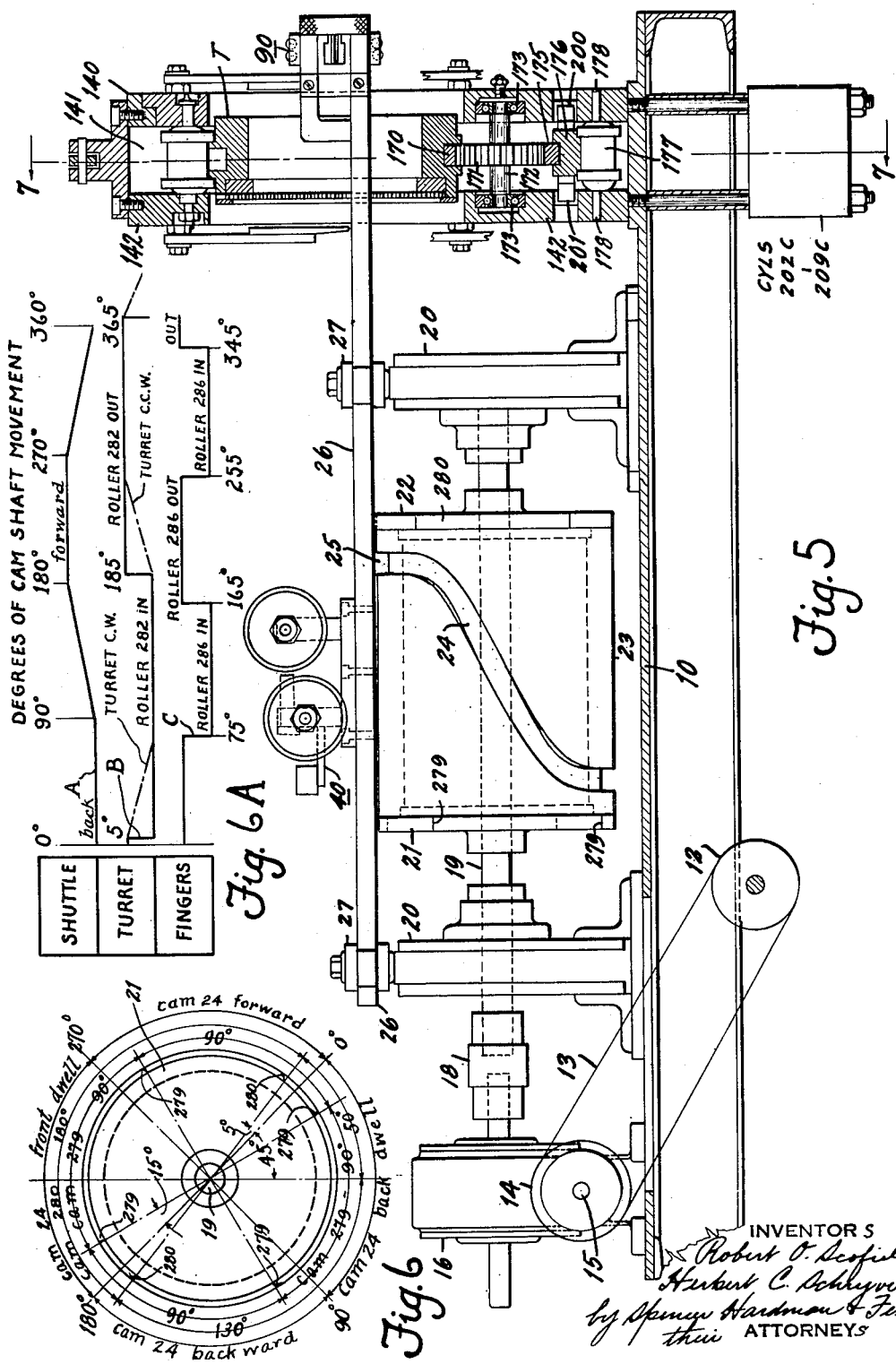

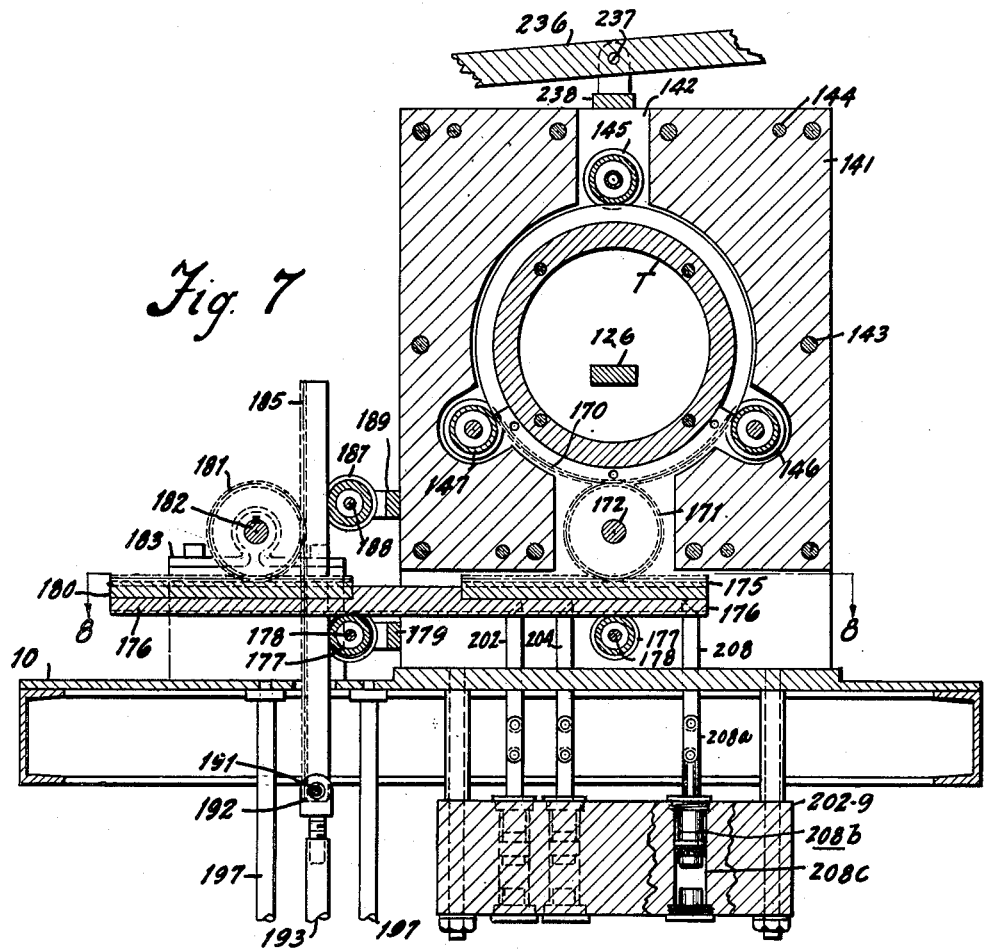
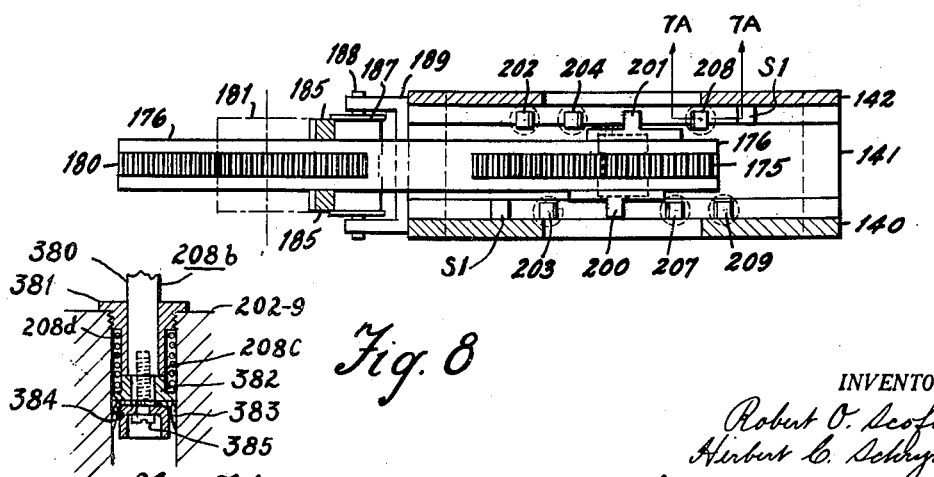

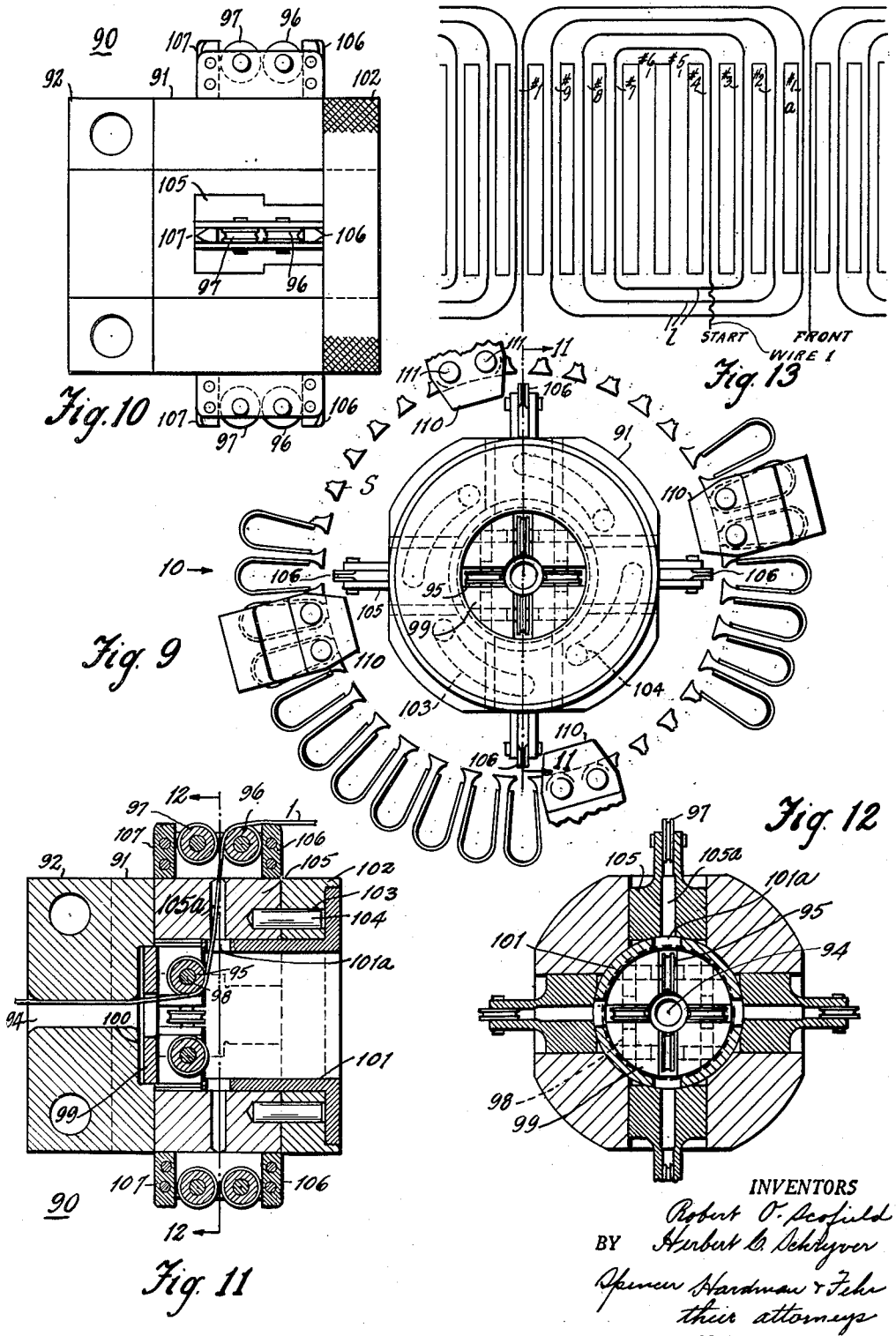

INVENTORS
Robert O. Scofield
Herbert C. Schryver
by Spencer Hardman + Fehr
their attorneys Jan. 6, 1953   R. O. SCOFIELD ET AL   2,624,518
STATOR WINDING MACHINE Filed Oct. 5, 1946   14 Sheets-Sheet 8

INVENTORS
Robert O. Scofield
Herbert C. Schryver
by Spencer Hardman & Fehr
their attorneys

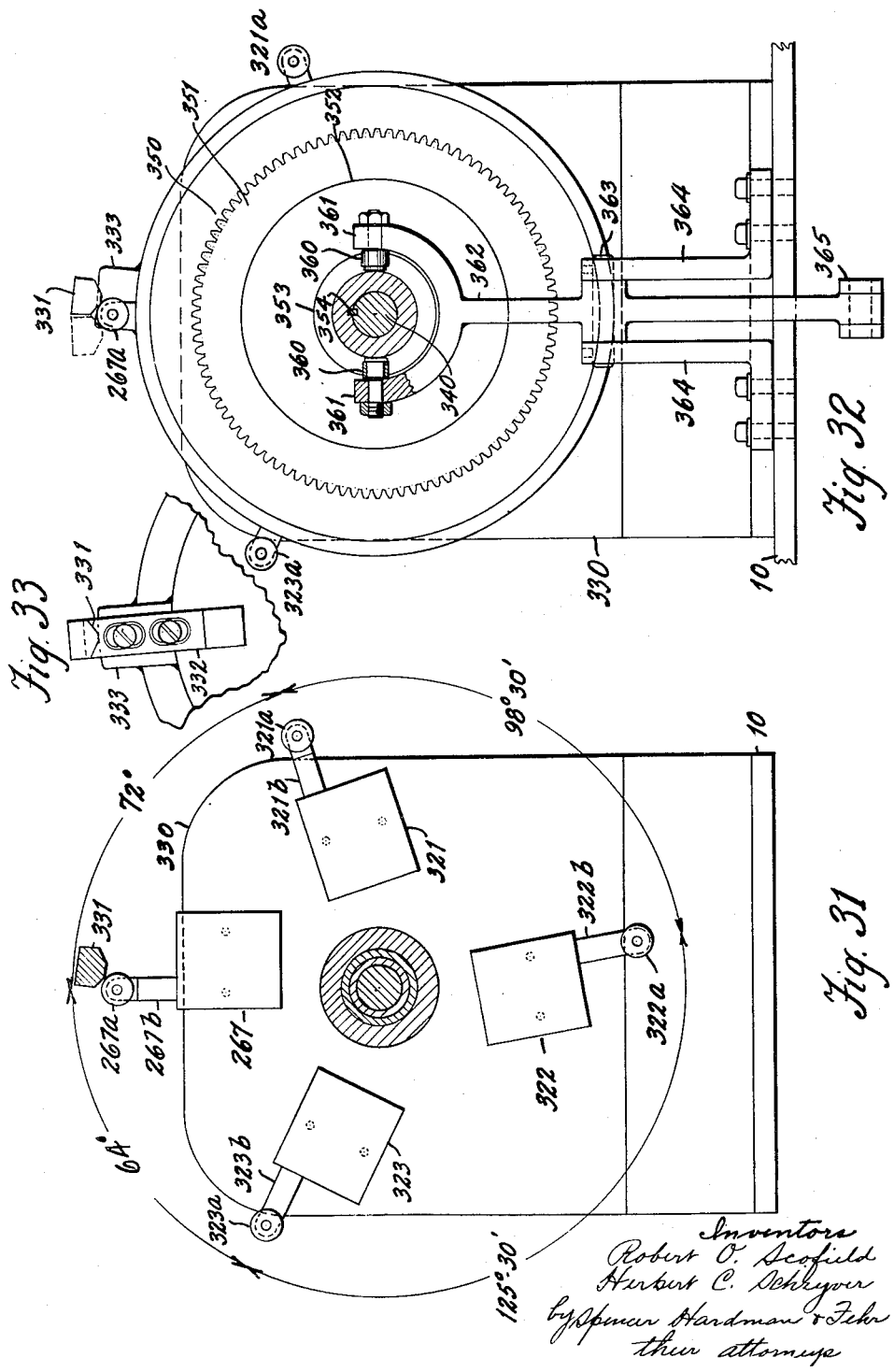

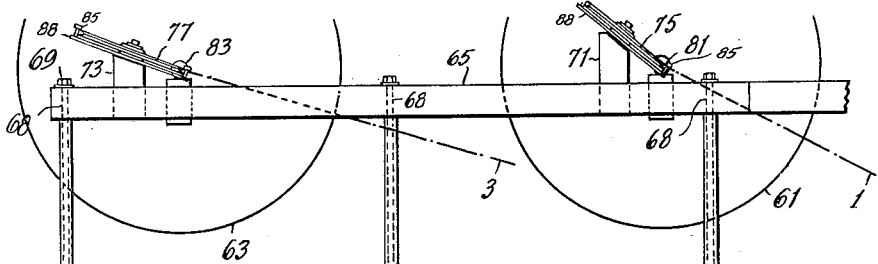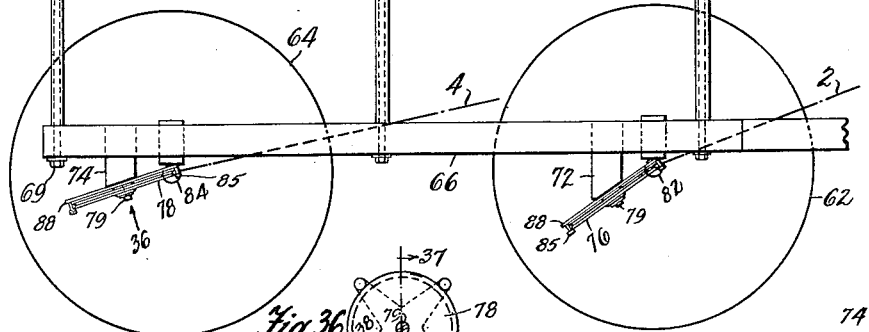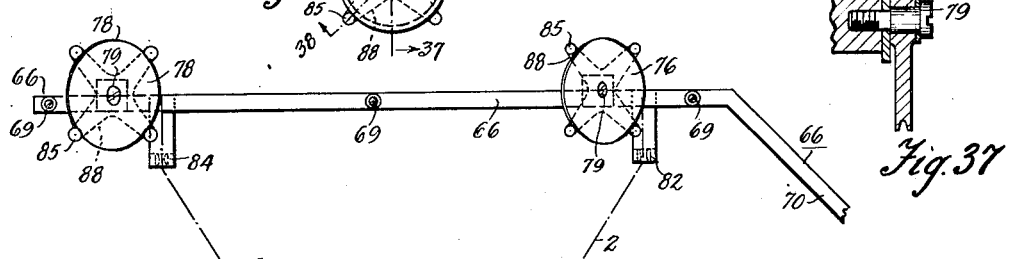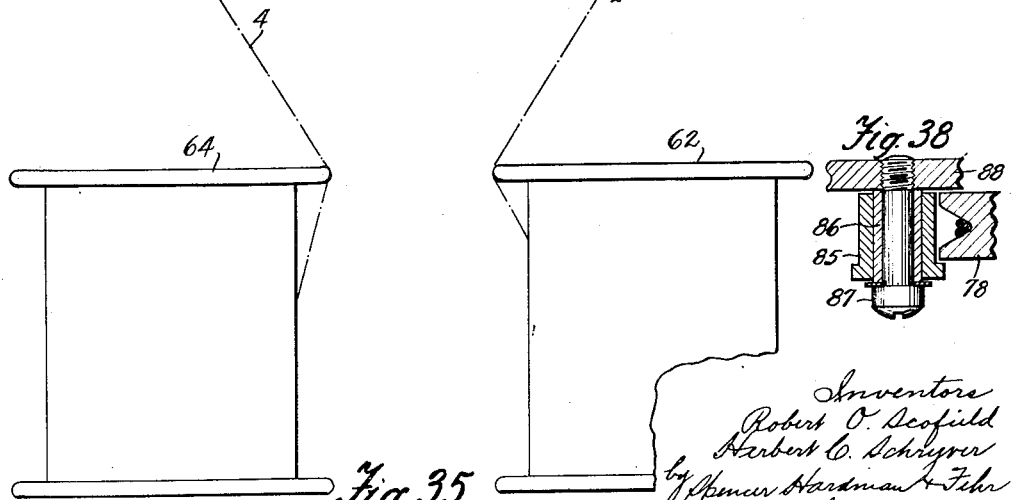

Patented Jan. 6, 1953

2,624,518

UNITED STATES PATENT OFFICE 2,624,518

STATOR WINDING MACHINE

Robert O. Scofield and Herbert C. Schryver, Warren, Ohio, assignors to General Motors Corporation, Detroit, Mich., a corporation of Delaware Application October 5, 1946, Serial No. 701,512

15 Claims. (Cl. 242—1)

This invention relates to the manufacture of alternating current dynamo electric machines and its object is to provide a machine of simple and durable construction by which stators of such machines may be wound efficiently.

Further objects and advantages of the present invention will be apparent from the following description, reference being had to the accompanying drawings, wherein a preferred embodiment of the present invention is clearly shown.

In the drawings:

Fig. 2 is a side view of the machine, looking in the direction of arrow 2 of Fig. 1, the sectional part being on line 2—2 of Fig. 1.

Fig. 3 is an end view in the direction of arrow 3 of Fig. 1.

Figs. 4A and 4B are fragmentary views looking in the direction of arrows 4A and 4B, respectively, of Fig. 3.

Fig. 5 is a sectional view on line 5—5 of Fig. 1.

Fig. 6 is a diagram of certain cams shown in Fig. 5.

Fig. 6A is a timing chart.

Fig. 7 is a sectional view on line 7—7 of Fig. 5.

Fig. 7A is a sectional view (enlarged) on line 7A—7A of Fig. 8.

Fig. 8 is a sectional view on line 8—8 of Fig. 7.

Fig. 9 shows a front view of the shuttle 90 drawn to a larger scale than Fig. 2 and shows portions of a stator S with which the shuttle cooperates.

Fig. 10 is a side view of the shuttle as viewed in the direction of arrow 10 of Fig. 9.

Fig. 11 is a sectional view on line 11—11 of Fig. 9.

Fig. 12 is a sectional view on line 12—12 of Fig. 11.

Fig. 13 is a diagram showing the location of the stator coils with respect to the stator slots.

Figure 14:
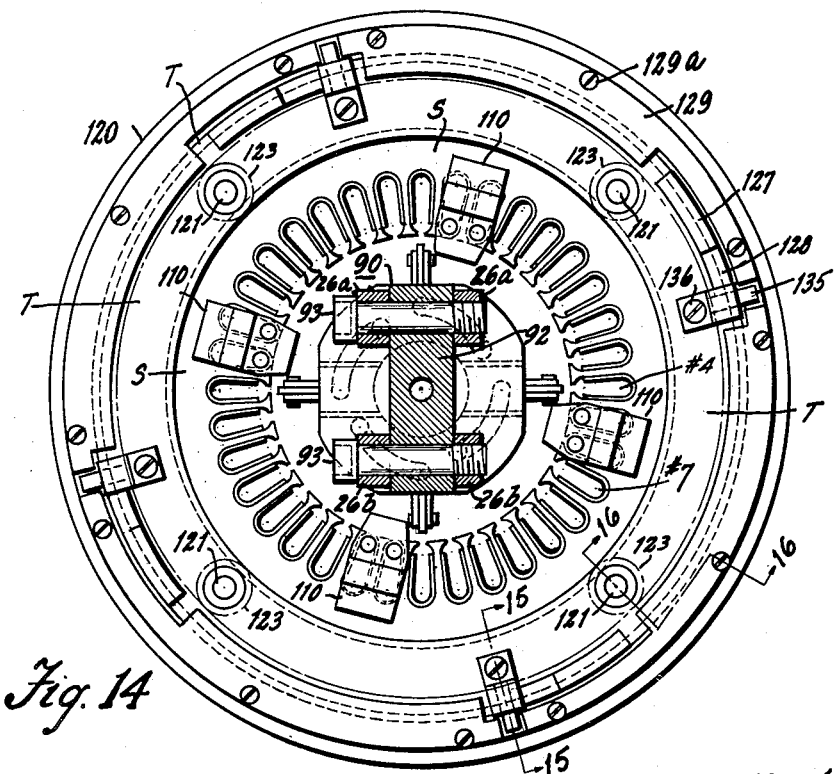
Fig. 14 is a view on line 14—14 of Fig. 1 and is drawn to a larger scale than Fig. 1. This figure shows a rear view of the shuttle and the stator mounted in turret T.
Figure 15:
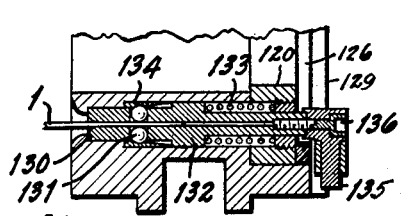
Figure 16:
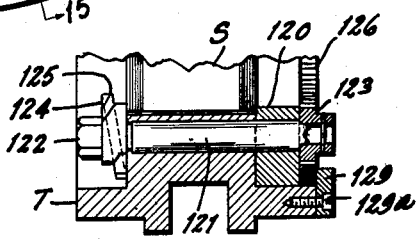

Figs. 15 and 16 are sectional views on lines 15—15 and 16—16, respectively, of Fig. 14.

Figures 17, 19, 20:
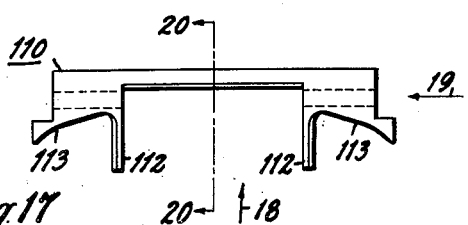

Fig. 17 is a side view of one of the devices 110 for locating the loops or cross-overs between the portions of the windings extending through the stator core slots.

Figure 18:
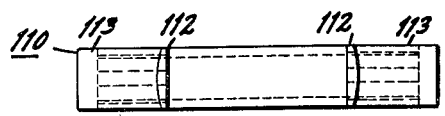

Figs. 18 and 19 are views looking in the direction of arrows 18 and 19, respectively, of Fig. 17.

Fig. 20 is a sectional view on line 20—20 of Fig. 17.

Figure 21:
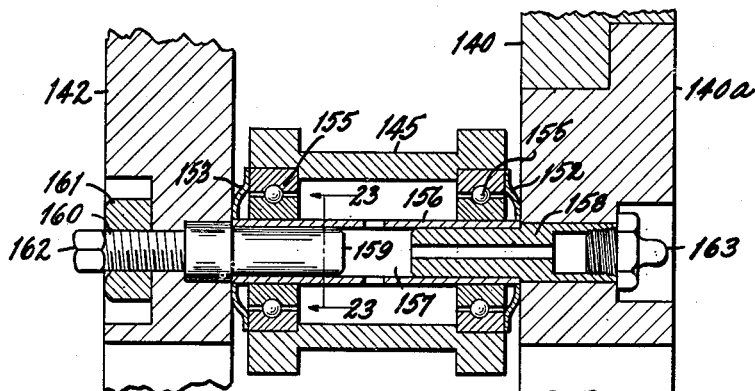
Figure 22:
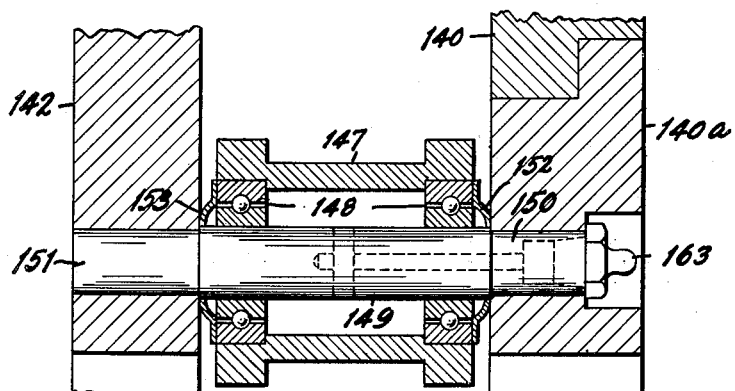

Figs. 21 and 22 are fragmentary sectional views on lines 21—21 and 22—22, respectively, of Fig. 3.

Figures 23, 24:
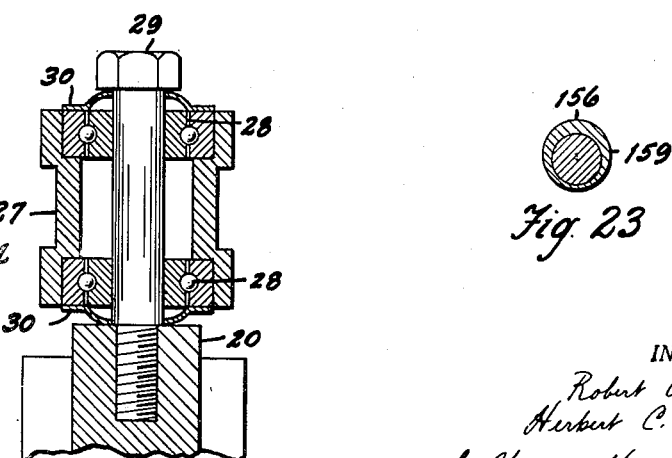

Fig. 23 is a sectional view on line 23—23 of Fig. 21.

Figure 1:
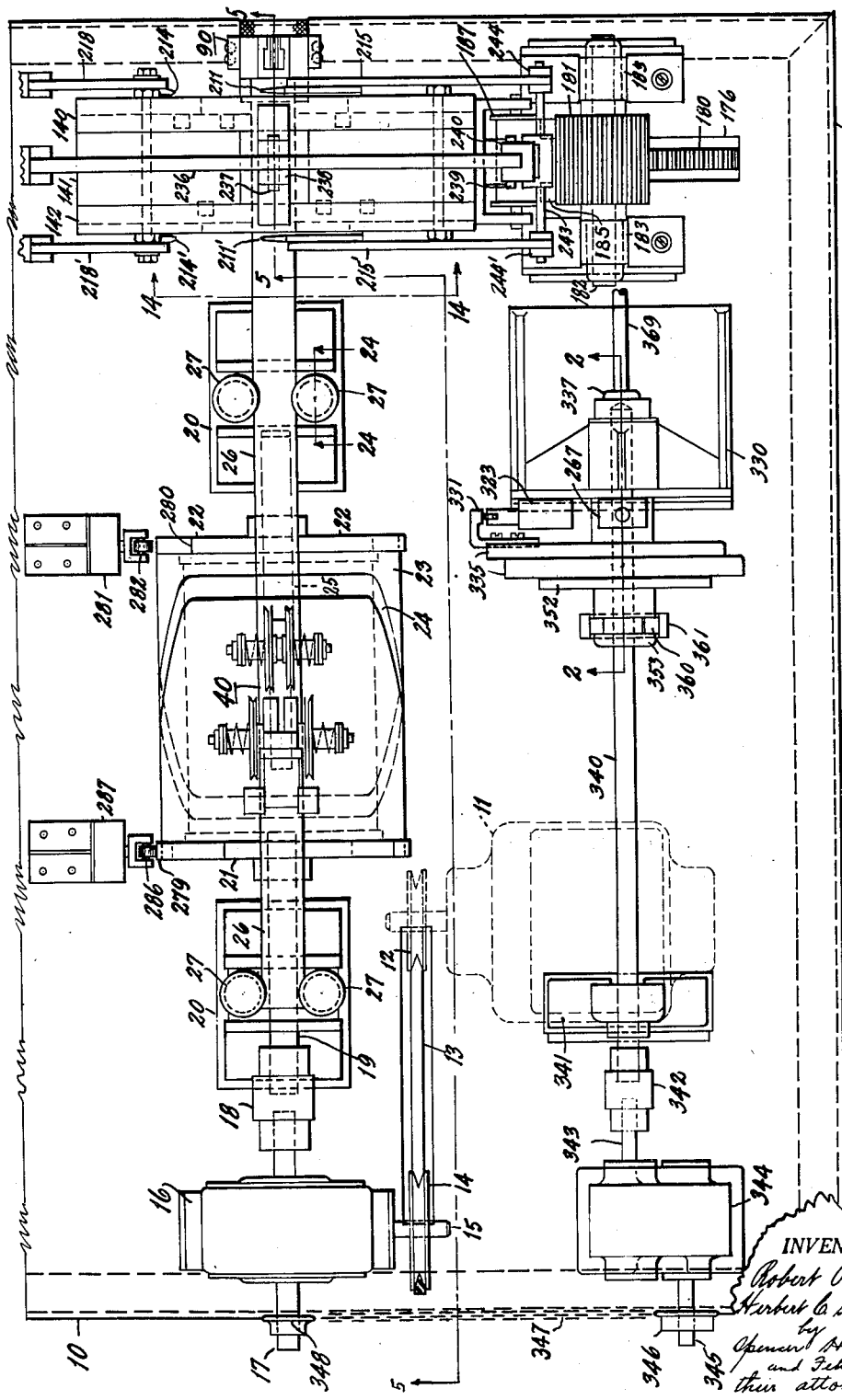
Fig. 1 is a plan view of a stator winding machine embodying the present invention.

Fig. 24 is a sectional view on line 24—24 of Fig. 1.

Figure 25:
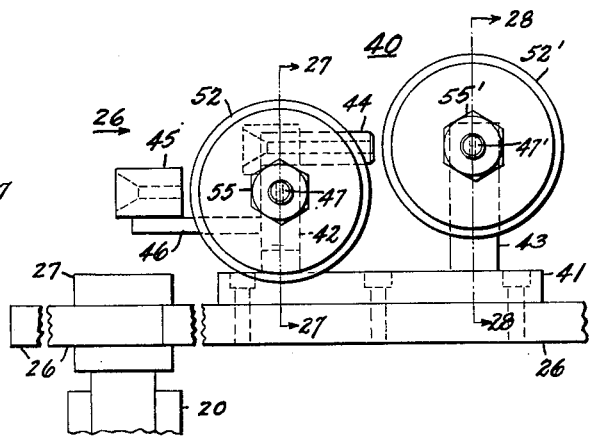

Fig. 25 is a side view of a wire tension device shown in Fig. 5 (middle) and is drawn to a larger scale.

Figure 26:
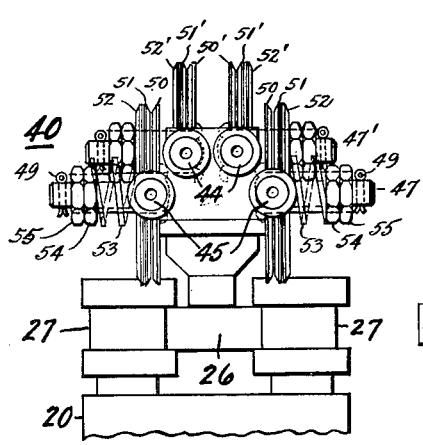

Fig. 26 is a view in the direction of arrow 26 of Fig. 25.

Figure 27:
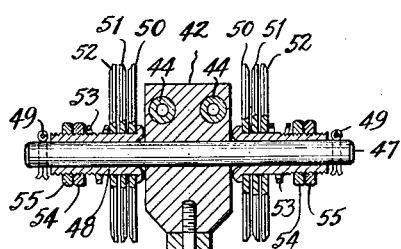
Figure 28:
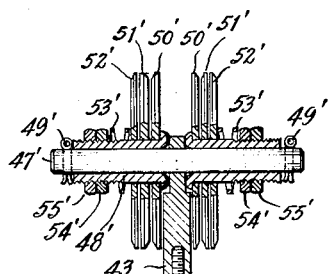

Figs. 27 and 28 are sectional views taken, respectively, on lines 27—27 and 28—28 of Fig. 25.

Figure 29:
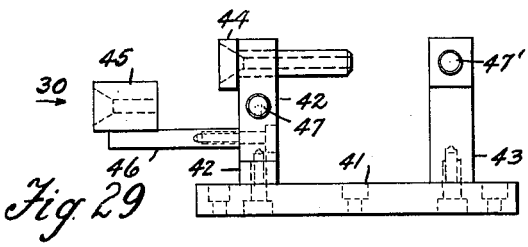

Fig. 29 is a side view of the tension device with certain parts removed.

Figure 30:
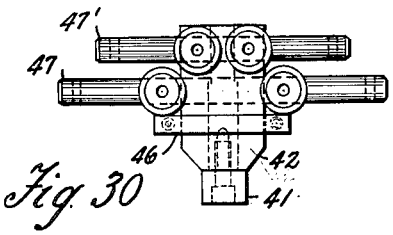

Fig. 30 is a view in the direction of arrow 30 of Fig. 29.

Figs. 31 and 32 are sectional views taken, respectively on the lines 31—31 and 32—32 of Fig. 2.

Fig. 33 is a fragmentary view in the direction of arrow 33 of Fig. 2.

Fig. 34 is a plan view of a device for guiding wires unreeled from supply spools to the machine.

Fig. 35 is a plan view thereof.

Fig. 36 is a view of one of the guiding wheels looking in the direction of arrow 36 of Fig. 34.

Fig. 37 is a sectional view on line 37—37 of Fig. 36 and is drawn to a larger scale.

Fig. 38 is an enlarged sectional view on line 38—38 of Fig. 36.

Figure 39:
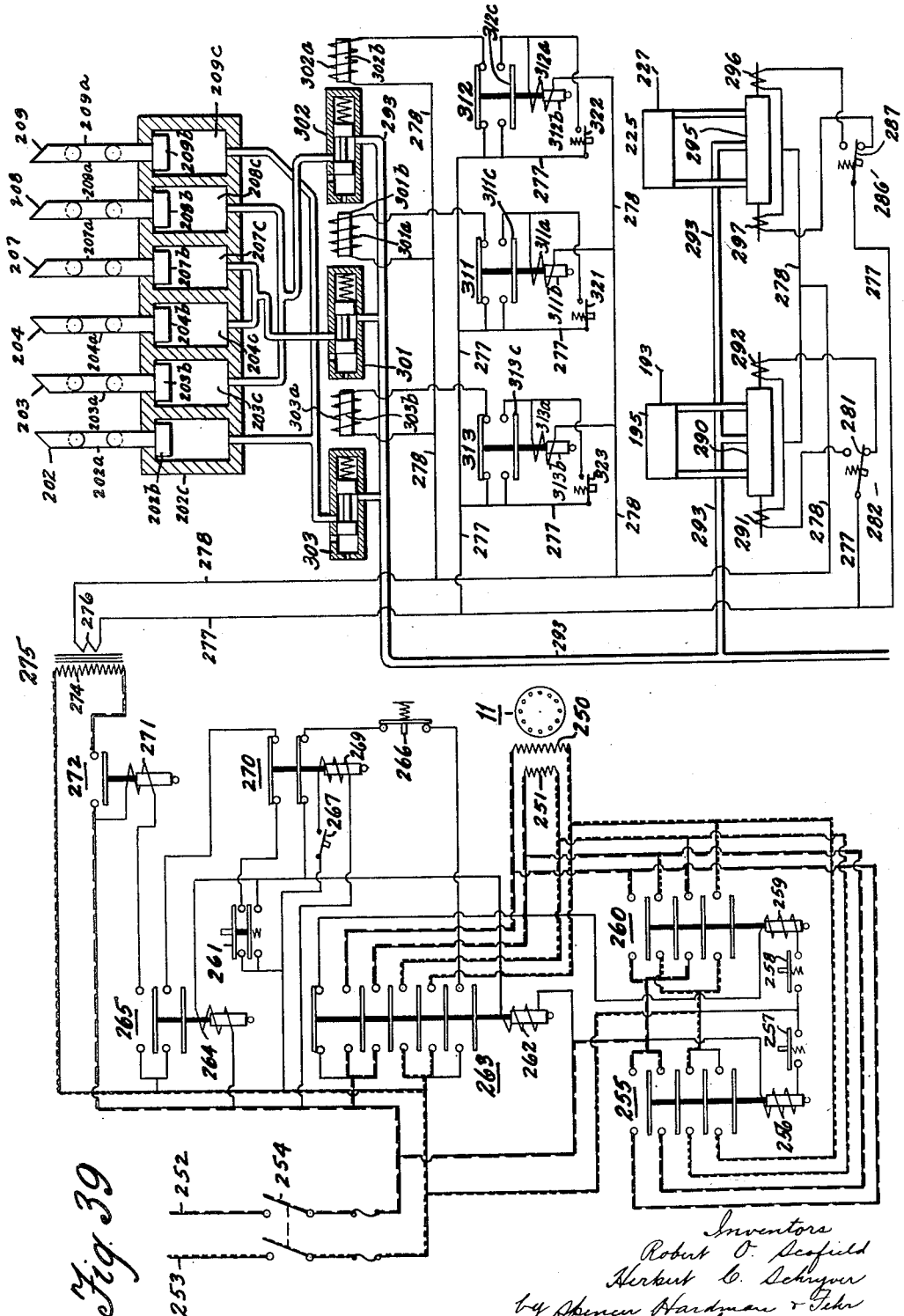
Figure 40:
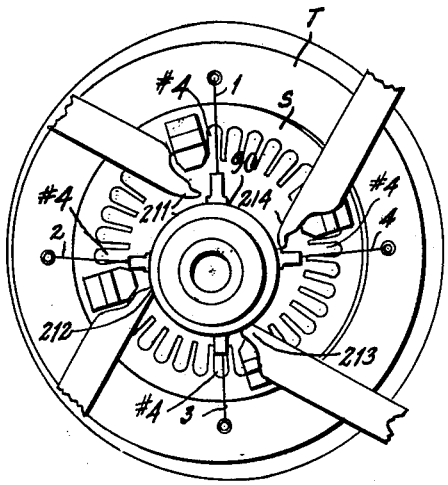

Fig. 39 is an electrical and hydraulic diagram of the controls of the machine.

Figs. 40, 41, 42, 43, 44, 45 and 46 are fragmentary perspective views showing relative positions of the shuttle 90 and stator S during the cycle of winding one coil on the stator.

Fig. 47 is a diagrammatic view showing various positions of a wire preceding and succeeding a back stroke of the shuttle 90 (right to left).

Referring to Fig. 1, 10 designates the top of a table supported by legs not shown above the floor. Underneath, the table supports an electric motor 11 which drives a pulley 12 connected by a belt 13 with a pulley 14 connected with a shaft 15 which, through a speed reducer 16, drives a shaft 17 at a reduced speed. A coupling 18 connects shaft 17 with a cam shaft 19 journaled in bearings provided by brackets 20.

Shaft 19 is connected with plates 21 and 22 attached to a cylindrical tube 23 provided with a cam groove 24 for receiving a roller 25 (see Fig. 5) pivotally supported by a shuttle bar 26 guided for horizontal movement by pairs of rollers 27 which are supported by the bearing brackets 20 in the manner shown in Fig. 24. Each roller 27 carries the outer race of a ball bearing 28, the inner race of which surrounds a screw stud 29 which is threaded into a bracket 20 and secures grease-retaining discs 30.

The bar 26 supports a wire tension device 40, the details of which are shown in Figs. 25 to 30. The device 40 comprises a base plate 41 and upright plates 42 and 43. Plate 42 supports four tubular wire guides, the two that are closest together being designated 44 and those furthest apart being designated 45. The tubes 45 are mounted on a shelf plate 46 extending from plate 42. Plate 42 carries a rod 47 which supports two sleeves 48 retained by pins 49 (Fig. 27). Each sleeve 48 carries discs 50, 51 and 52 which, though shown separated in Fig. 27, are in fact urged together by a spring 53, the compression of which may be adjusted by a nut 54 secured by a nut 55. Each pair of discs 50, 51 provides a V-groove in vertical alignment with the hole through a guide tube 45. The plate 43 (Fig. 28) supports a construction similar to the parts numbered 47 through 55 of Fig. 27, the parts which are like those in Fig. 27 being indicated by the same reference numeral with a prime affixed. Each pair of guide wheels 50', 51' makes a V-groove in alignment with the hole through a guide tube 44. The wires which are to be wound upon a stator are passed, respectively, through holes in the guide tubes 44 and 45 and between the discs 50', 51' or 50, 51 and are attached before the windings start to the stator turret T to be described.

The four wires indicated by the dot-dash lines 1, 2, 3 and 4 (Fig. 34) are unwound from four supply spools 61, 62, 63 and 64 which are located below a frame comprising channel bars 65, 66 spaced by tubes 67 through which there pass rods 68 which are threaded at both ends to receive nuts 69. The frame channels 65 and 66 each having a portion 70 inclined downwardly toward the table supporting structure to which the channels are attached in any suitable manner. The channels carry blocks 71, 72, 73 and 74 providing pivotal supports for guide wheels 75, 76, 77 and 78, which are pivotally supported by screws 79 as shown in Fig. 37. The channels support wire guiding eyes 81, 82, 83 and 84 through which the wires 1, 2, 3 and 4, respectively, are passed before being passed around the guide wheels 75, 76, 77 and 78, respectively. The wires are passed once around each wheel before being passed through one of the guide tubes 44 or 45 of the tension device and then between a pair of tension discs 50, 51 or 50', 51'. The wires are retained upon the wheels 75—78 by rollers 85 (Fig. 38) each journaled on a bearing 86 secured by a screw 87 to a bracket 88 which a screw 79 secures to blocks 71—74.

Figure 43:
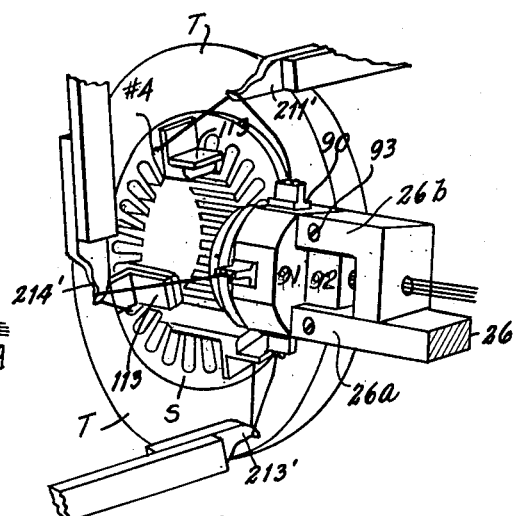

The right end (Fig. 1) of bar 26 supports a shuttle 90 which will now be described in detail with reference to Figs. 9 through 12. As shown in Fig. 43, the bar 26 has notched parts 26a and 26b which receive the rib 92 of a shuttle body 91. Screws 93 secure the shuttle body to the parts 26a and 26b. The body 91 has a longitudinally extending hole 94 through which four wires are passed, one wire (wire 1) being shown in Fig. 11. Wire 1 passes around a guide wheel 95 and may pass around either of two guide wheels 96 and 97 depending on which direction the shuttle is moved relative to the stator. The four guide wheels 95 are journaled on pins 98 supported by a block 99 located in a recess 100 provided by the body 91. The recess 100 receives also a sleeve 101 secured therein in any suitable manner as by set screws not shown. Sleeve 101 provides a bearing for a cam plate 102 having cam slots 103 each for receiving a pin 104 attached to a block 105 which, as shown in Fig. 12, is guided by the body 91 for movement radially with respect to the hole 94. Each block 105 supports a pair of pulleys 96 and 97 and is provided with a hole 105a through which the wire passes, said wire passing also through a hole 101a provided by the sleeve 101. The guide wheels 96 and 97 which each block 105 carries have their grooves in alignment with the V-edges of plows 106, 107, respectively, carried by each block 105. In Figs. 9 and 12 the guide wheels and plows are shown in retracted position so that the shuttle may be moved through the stator S without engaging it. The shuttle is conditioned for the wire positioning operations by turning the cam disc 102 so as to move the rollers 96, 97 and the plows 106, 107 outwardly. Before the shuttle performs the wire positioning operation, it is necessary to feed the four wires through the shuttle and then attach them to the turret T at different points thereof.

Fig. 13 shows a wiring diagram for one of the four stator poles. Each stator pole includes a group of nine teeth spaced by slots numbered 2 through 9, the end teeth of each group being adjacent to slots numbered 1. The winding is started with slots 4 in winding position. The shuttle moves from front to rear to locate wires in slots 4; the turret turns to position slots 7 in alignment with the shuttle plows; the shuttle moves from rear to front to deposit wires in slots 7; and the turret turns to locate slots 4 in alignment with the shuttle plows. This cycle is repeated until a predetermined number of turns have been placed in slots 4 and 7. Then after the last pass of wire through slots 7, the turret turns so as to bring slot 3 instead of slot 4 into alignment with the shuttle plows. Then the machine operates to place a predetermined number of turns of wire in slots 3 and 8, then to place a predetermined number of turns of wire in slots 2 and 9 and finally to place a predetermined number of turns of wire in slots 1 and 1a. Since the 1 and 1a slots receive turns from a plurality of pole groups, the number of turns of each pole group wound into slots 1 and 1a are less than the number of turns of each pole group wound into slots 2 and 9 for example. Slots 5 and 6 do not receive any wire.

In order that the cross-over or loops l, do not interfere with winding, they are caused to be positioned on locators 110 which are attached to the stator S before it is located within the turret T. The four loop locators 110 are attached to the stator as shown in Figs. 9 and 14 by pins 111 passing through the slots 5 and 6. Each locator 110 comprises a bar which fits the inner periphery of the core teeth adjacent slots 5 and 6. There are two projections 112 spaced apart a distance slightly exceeding the thickness of the stator core. The projections 112 merge into projections 113 upon which the loops l are deposited by mechanically operated fingers to be described.

The turret T carries a locating key 115 (Fig. 3) received by a notch 116 of the stator core S to locate the latter with respect to the shuttle. The turret provides a ring 120 against which the stator core S is pushed when inserted within the turret. The stator core is retained by rotatable clamping devices as shown in Fig. 16 each comprising a shaft 121 having a hex head 122 to which a socket wrench can be applied and having a gear 123 attached thereto and having a flange 124 which provides a helical cam 125 for gripping the stator core to force it against the ring 120. As shown in Fig. 3, the flanges 124 have been turned into the positions which they would occupy when the stator core is clamped. When the stator core is unclamped, the flats 124a of the flanges 124 are in line with the inner periphery of the turret T so that the stator core can be passed into the turret to be clamped therein or removed from the turret after being unclamped.

Before winding starts, the end of each wire is attached to the turret. For example, wire 1 (Fig. 15) is passed through a bushing 130 and through a row of balls 131 and into a sleeve 132. A spring 133 urges the sleeve 132 to the left to urge the balls against a sleeve 134, the interior surface of which is conical. Therefore, the balls 131 are pressed firmly against the wire to resist retraction thereof. After winding the stator, it is necessary to move the sleeve 132 right. This is accomplished by the turning of the shafts 121 in the direction for releasing the stator core S. When one shaft 121 is turned a ring gear 126, with which all of the gears 123 mesh, is caused to rotate clockwise in Fig. 14, thereby causing each of four cams 127 having inclined surfaces 128 to engage a cam follower 135 which a screw 136 attaches to a sleeve 132. By turning the ring gear 126, which is retained on ring 129 by plates 129 and screws 129a, all of the sleeves 132 are caused to move right in Fig. 15 so that the wire ends are released.

The turret T is enclosed by a supporting frame comprising a front plate 140 (Fig. 1), an intermediate plate 141 and a back plate 142 secured together by screws 143 and locating dowels 144. The frame rotatably supports grooved rollers 145, 146 and 147 cooperating with flanges provided by the turret. Therefore the turret is supported for rotation about its own axis and radial movement thereof is prevented. Rollers 146 and 147 are supported by the frame in the same manner. Referring to Fig. 22, the roller 147 carries the outer races of ball bearings 148, the inner races of which are supported by a rod 149 having reduced portions 150 and 151 received by holes in block 140a (attached to plate 140 by screws 149b) and 142 respectively. Grease-retaining discs 152 and 153 are located between the bearings 148 and the plates 140 and 142 respectively. The roller 145 is supported in the manner shown in Fig. 21. It carries the outer races of ball bearings 155 whose inner races are supported by a sleeve 156 which, as shown in Fig. 23, has a hole therethrough which is eccentric to the outer surface. This hole, numbered 157 in Fig. 21, receives rods 158 and 159 press-fitted into sleeve 156 and rotatably supported by a block 140a and the plate 142, respectively. Rod 159 has a threaded part 160 receiving a nut 161 and a hex head 162. When the nut 161 is loosened from clamping engagement with the frame 142, the sleeve 156 can be turned by a wrench applied to the hex 162 for the purpose of changing the distance between the roller 145 and the rollers 146 and 147, thereby maintaining the turret T in contact with the rollers 146 and 147 while permitting freedom of rotary motion of the turret. The bearings of the rollers 145, 146 and 147 are supplied with lubricant forced by grease gun through the nipples 163 (Figs. 21 and 22).

Referring to Figs. 5 and 7, the turret T carries a gear segment 170 meshing with a gear 171 carried by a shaft 172 journalled in bearings 173 supported by the plates 140 and 142. Gear 171 meshes with a rack 175 carried by a bar 176 supported by rollers 177 journaled on rods 178, one of the rods being supported by the plates 140 and 142 and the other by a bracket 179. Bar 176 carries a rack 180 meshing with a gear 181 fixed to a shaft 182 journalled in bearings provided by brackets 183. Gear 181 meshes also with two racks 185 (Fig. 2) positioned by the roller 177 and a roller 187 journalled on a rod 188 supported by a bracket 189. The two racks 185 are tied together at their top ends by a rod 190 and at their bottom ends by a rod 191. Rod 191 passes through a clevis 192 having screw threaded connection with a piston rod 193 attached to a piston 194 in a cylinder 195 having an end member 196 attached to rods 197 attached to the table 10. By means of pressure fluid admitted alternately to the ends of the cylinder 195, the racks 185, 180 and 175 are reciprocated and turret T is oscillated.

The amplitude of oscillation of the turret is variable, being least when wires are being wound into slots 4 and 7 and being greatest when wires are being wound into slots 1 and 1a. Referring to Fig. 8, the rack bar 176 carries a stop lug 200 for engagement with stop bars 203, 207 and 209 and a stop lug 201 for engagement with stop bars 202, 204 and 208. When the machine starts to wind a stator, all of the stop bars are up in the plane of movement of the stop lugs 200 and 201 as indicated in Figs. 3 and 7. The cycle starts with lug 201 against (to the right of) bar 204. While the machine is placing wires in slots 4 and 7, movement of bar 176 to the right is limited by the engagement of lug 200 with stop 207; and movement of the bar 176 to the left is limited by engagement of the lug 201 with stop 204. Before the machine begins placing wire in slots 3 and 8, stops 204 and 207 are moved below the plane of movement of lugs 200 and 201. Then during the placing of wire in the slots 3 and 8, right movement of bar 176 is limited by engagement of lug 201 with stop 208 and left movement is limited by engagement of lug 200 with stop 203. Before the machine begins to place wire into slots 2 and 9, the stops 203 and 208 move down, leaving stops 202 and 209 to limit movement of the bar 176. Before placing wire in slots 1 and 1a, the stops 202 and 209 move down. Then the maximum oscillation of turret T is determined by the fixed stops S1 shown in Fig. 8.

Stops 202—209 are connected, respectively, by links 202a—209a with pistons 202b—209b, operating in cylinders 202c—209c, respectively (Fig. 39). The construction of a piston, such as 208b, is shown in Fig. 7A. Its rod 380 passes through a bushing 381 screwed into the blocks 202—209 which provide the cylinders including 208c. Rod 380 passes through a guide washer 382 and a leather cup 383. A screw 385 attaches a metal cup 384 and the leather cup 383 to the rod 380. When compressed air is applied below the leather cup 383, its skirt is forced against the cylinder wall. When air pressure is released, the piston is forced toward the bottom of the cylinder by means of a spring 208d. At the beginning of the cycle, there is pressure fluid in all of the cylinders so that all of the stops are up. The release of pressure fluid from the cylinders will be described later.

Before a movement of the turret begins, the wire portions which are to form the cross-over loops are engaged by fingers which, during rotation of the turret, hold the wires outwardly and away from the winding zone and which, just before shuttle movement begins, release the wire loops for movement upon the surfaces 113 of the loop locators 110 as the wires are pulled through the core slots by the shuttle. At the front of the machine (Fig. 3), there are four fingers 211, 212, 213 and 214 supported, respectively, by levers 215, 216, 217 and 218 pivoted, respectively, at 219, 220, 221 and 222. All of these levers are operated by fluid pressure admitted alternately to the ends of a cylinder 225 pivotally supported by a bracket 225a and receiving a piston 226 connected by a rod 227 with a clevis 228 connected by a pin 229 with clevises 230 and 231 attached, respectively, to rods 232 and 233 (Fig. 4B). Rod 229 is connected with lever 217. Clevis 231 is connected by rod 233 with lever 218. Rod 232 is connected with a clevis 234 connected by pin 235 with a lever 236 pivoted at 237 on a bracket 238 attached to the frame plates 140 and 142. Lever 236 is connected by a pin 239 with a clevis 240 connected by a screw rod 241 with a clevis 242 connected by a pin 243 with the lever 215 and with a clevis 244 connected by a rod 245 with lever 216. On the rear side of the frame plate 140 there are located four similar fingers 211', 212', 213' and 214' (Fig. 42) supported by levers 215', 216', 217' and 218' which are actuated concurrently with the actuation of fingers 211 through 214 and by a similar mechanism, the parts of which are identified by the numbers applied to the similar parts previously described but with a prime affixed. For example, in Fig. 4B, the lever 217' is actuated by the rod 229 which is connected with a clevis 231' connected by rod 233' with the lever 218'. Referring to Fig. 4A, the pin 243 is connected with lever 215' and with a clevis 244' connected by a rod 245 with the lever 216'. Near the end of each movement of the shuttle, either toward the front of the machine or toward the rear, there is an outward movement of all of the fingers; and, just after each movement of the shuttle, there is a movement of the turret followed by an inward movement of the fingers followed by movement of the shuttle. For example, near the end of movement of the shuttle toward the front of the machine, as viewed in Fig. 3, the fingers 211—214 move outwardly to pick up the wires so that, during movement of the turret, the winding zone is clear and so that, during movement of the shuttle, the wire loops will be pulled inwardly against the surfaces 113 of the members 110. Similarly, near the end of a backward movement of the shuttle, the fingers at the rear of the frame move outwardly for the same purpose and then inwardly after the turret has rotated. For each revolution of the cam shaft 19, the shuttle oscillates once and the fingers oscillate twice.

Referring to Fig. 39, the motor 11 is a single-phase A. C. motor having a running winding 250 and a starting winding 251. These windings receive alternating current from a source connected with wires 252 and 253 having a two-pole switch 254 connecting with the control circuits. While the polarity of alternating current is continuously reversing, for purpose of explanation, it may be considered as unidirectional; therefore, the wires having the same polarity as 252 are indicated by long dashes while those of opposite polarity connected with wire 253 are indicated by short dashes.

There is a magnetically operated switch 255 having a magnet coil 256 which is energized by closing switch 257, thereby causing the contacts of switch 255 to move up to make circuits which will cause the motor 11 to rotate in the normal or forward direction. Motor 11 rotates in this direction only so long as the switch 257 is closed. If it is desired to cause the machine to operate momentarily in a reverse direction, a switch 258 is closed to effect the energization of the magnet coil 259 of a motor reversing switch 260 whose contacts will move up to complete circuit which will effect the reversal of polarity of the starting winding 251. In other words, the machine can be jogged forward by pressing switch 257 or jogged backward by pressing switch 258. The jogging of the machine is done preparatory to the normal winding operation. After the machine has been conditioned for the normal winding operation, a start switch 261 is pressed in order to effect the energization of the magnet coil 262 of a switch 263 and the energization of the magnet coil 264 of a switch 265. After these switches have closed certain contacts, their magnet coils remain energized although start switch 261 is released. There is a manually operated stop switch 266 which, on being pressed, will deenergize the magnet coils 262 and 264, so that switches 263 and 265 will open. There is an automatically operated stop switch 267 which, on being closed, will effect the energization of a magnet coil 269 of a switch 270, thereby causing said switch to open for the purpose of deenergizing magnet coils 262 and 264. When switch 265 closes contact, a magnet coil 271 of a switch 272 is energized to effect the closing of switch 272 which connects the primary 274 of a transformer 275 with wires 252 and 253. The secondary 276 is connected with wires 277 and 278.

Referring to Figs. 1, 5, 6 and 6A, the plate 21 carries 2 cams 279 and the plate 22 carries one cam 280 which are located with respect to drum cam 24 in the manner represented by Fig. 6. These cams rotate clockwise in Fig. 6. The zero mark is at end of back travel of the shuttle. Fig. 6A shows the timing for one revolution of cam shaft 19 according to the cam diagram shown in Fig. 6. Line A shows that the shuttle has 90° dwell in the back position, a forward movement between 90° and 180°, a forward dwell between 180° and 270° and a back movement between 270° and 360°. Line B shows control of turret movement through the action of cam 280 which controls switch 281 by contact with an actuating roller 282. Just before 5° roller 282 is out. At 5° cam 280 releases roller 282 and the spring within a switch 281 forces it in against the plate 22. Between 5° and 185°, roller 282 is in. At 185° cam 280 pushes roller 282 out and it remains out for 180° or until the 5° position. Piston 193 moves up after roller 282 moves from out to in position. This causes clockwise movement of the turret T as viewed from the front. The time for this movement is variable depending on the location of the stops which limit its movement. Maximum rotation of the turret is completed before about 75° of cam shaft rotation. Following movement of roller 282 from in to out at 185°, piston 193 moves down to effect counterclockwise rotation of the turret as viewed from the front. This movement is completed before 270° cam shaft rotation. Line C represents control of the wire engaging fingers 211—214 and 211'—214' through the cooperation of cam 279 with rollers 286 of a switch 287. Just before the end of backward movement of the shuttle, roller 286 is moved from in to out position at 345°. Piston 226 moves up and the hooks move out to engage the wires and to hold them out while the turret rotates clockwise. By at least 75°, the turret has completed its maximum rotation and switch roller 286 is released by a cam 279 so that a spring in a switch 287 moves it against the plate 21. Between 75° and 165°, piston 226 moves down and the fingers 211—214 and 211'—214' move in. At 75°, the fingers begin to release the wire loops so that they will move toward the loop locating surfaces 113 of 116 as the shuttle moves forward. At 165°, near the end of the forward movement of the shuttle, a cam 279 moves roller 286 out. The piston 226 moves up and the fingers move out again to hold the wires up during counterclockwise movement of the turret. By the time the turret has completed this movement at 255°, a cam 279 releases the roller 286 so that it moves in against the plate 21, piston 226 moves down and the fingers move in.

The control of the pistons 194 and 226 will now be described with reference to Fig. 39. The ends of cylinder 195 containing piston 194, are connected with an electrically operated valve 290 having a movable valve member whose positions are controlled by magnets 291 and 292. Switch 281 is shown in the position which it has between 5° and 185°. When the switch 281 is in this position, magnet coil 292 is connected by the wires 277 and 278 so that it is energized to condition valve 290 for connecting the right end of cylinder 195 with exhaust and the left end of the cylinder with a pipe 293 connected with a source of fluid pressure such as compressed air. This causes piston 194 to move right in Fig. 39 or up in Fig. 7 to effect clockwise rotation of the turret. When switch 281 is moved to the up position effected by outward movement of roller 282, magnet coil 292 is disconnected from the current source and coil 291 is connected. This conditions valve 290 for connecting the left end of the cylinder 195 with exhaust and the right end with the pressure pipe 293. Then the piston 194 moves left in Fig. 39 or down in Fig. 7 to effect counterclockwise movement of the turret.

Fig. 39 shows switch 287 with its roller 286 in the down position or corresponding to the in position of Fig. 6A. The ends of cylinder 225 containing piston 226 are connected with fluid pressure source by a valve 295 having controlling magnets 296 and 297. When switch 287 is in the position shown effected by inward positioning of roller 286 between 75° and 165° and between 255° and 345°, magnet 297 is energized, in order to condition the valve 295 for causing the right end of cylinder 225 to be connected with pipe 293 and the left end of the cylinder will be connected with exhaust, and the piston 226 moves left in the diagram or down in Fig. 3, to pull the fingers in. At 165° and at 345°, a cam 279 engages the roller 286 to move it out in order to disconnect magnet 297 from the current source and to connect magnet 296 therewith. This causes the valve 295 to be conditioned for connecting the left end of cylinder 225 with the pipe 293 and the right end with the exhaust; and the piston 226 moves right in Fig. 39 or up in Fig. 3 to move the fingers out.

The control of the stops 202—209 will now be described. Cylinders 204c and 207c are connected together with a normally open valve 301 connected with pipe 293. Cylinders 203c and 208c are connected together with a normally open valve 302 connected with pipe 293. Cylinders 202c and 209c are connected together with a normally open valve 303 connected with pipe 293. Since the valves are normally open all of the stops will be up. The valves are spring urged to the left (closed position) but are held open by solenoid coils 301a, 302a and 303a, respectively, cooperating with armatures 301b, 302b and 303b, respectively. The coils 301a, 302a and 303a are normally energized. Their circuits are controlled by switches 311, 312 and 313 respectively which can gravitate in the position shown. These switches are raised by the operation of electromagnets 311a, 312a and 313a cooperating with armatures 311b, 312b and 313b. The circuits of these electromagnets are respectively closed by switches 321, 322 and 323 which are normally open. When switches 321, 322, 323 are closed, then the circuits of their respective magnets are completed and thereafter maintained by the circuit making members 311c, 312c and 313c. Consequently when switch 321 is momentarily closed, stops 204 and 207 move down. When switch 322 is momentarily closed, stops 203 and 208 move down and when switch 323 is momentarily closed, stops 202 and 209 move down. As stated before, after these switches have been closed, the stops remain down and they do not go up again until switch 267 is automatically closed at the end of the winding cycle. If, at the end of the winding cycle, the stop lugs are not between stops 204 and 207, these lugs can get back to the starting position simply by overriding the stops which have beveled surfaces so as to permit the lugs to cam the stops down against the action of compressed air.

It is evident that the switches 321, 322, 323 and 267 operate in sequence in a predetermined timed relation which will be apparent in Fig. 31 which shows these switches arranged in predetermined position on a supporting bracket 330. The switches are urged normally to open position by springs within the switch cases and each are closed by the operation of a cam 331 upon rollers 321a, 322a, 323a and 267a of the respective switches, said rollers being respectively supported by switch actuating plungers 321b, 322b, 323b and 267b. By way of example, the angular spacing of the switch actuating rollers and plungers is shown in Figure 31. The cam 331 is provided by a bracket 332 which can be radially adjusted with respect to a plate 333 by means of screws 334. Plate 333 is integral with a disc 335 (Fig. 2) having a hub 336 supported by a sleeve 337 journalled in a bearing 338 provided by bracket 339. Sleeve 337 provides bearings 339 for a shaft 340 which is journalled in bearing bracket 341 and is connected by a coupling 342 with the driven shaft 343 of a speed reducer 344 whose driving shaft 345 is connected with shaft 17 by sprocket 346, chain 347 and sprocket 348. During each winding cycle, shaft 340 rotates about once and shaft 17 rotates a number of times equal to the number of coils placed on the stator. Shaft 340 is connected with the disc 335 by a clutch which comprises a ring gear 350 attached to the disc 335 and meshing with a disc 351 having tooth spaces receiving the teeth of gear 350 and being attached to a disc 352 whose hub 353 is splinedly connected by a sliding key 354 with shaft 340. Hub 353 is grooved to receive rollers 360 (Fig. 32) carried by the arms 361 of a lever 362 pivoted on a rod 363 supported by brackets 364. The lower end of the lever 362 is connected with a rod 365 having a handle 366. If it should be necessary to stop the machine before the cycle is completed and then start over again without going through the cycle, this can be accomplished by resetting the timing. To do this the operator pulls the handle 366 right to separate gear 351 from gear 350. Then the timing disc 335 with its timing cam 331 is returned to start position by turning a hand wheel 367 supported by a bracket 368 and connected by rod 369 with the sleeve 337, preferably integral therewith. After the timing has been reset, as indicated on a dial 370 provided by bracket 368 on the front of the machine (Fig. 3), the operator pushes the handle 366 left to reconnect gears 351 and 350.

*Résumé of operation*

Figure 41:
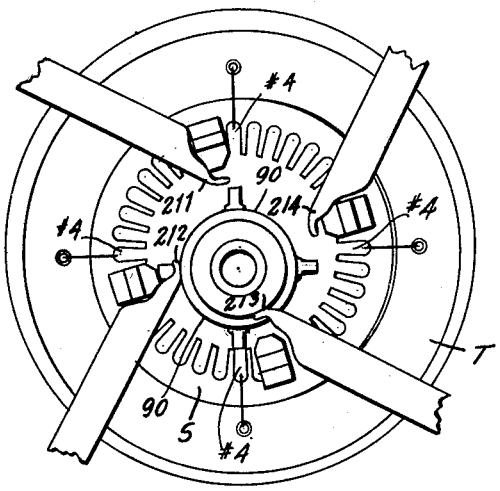
Figure 42:
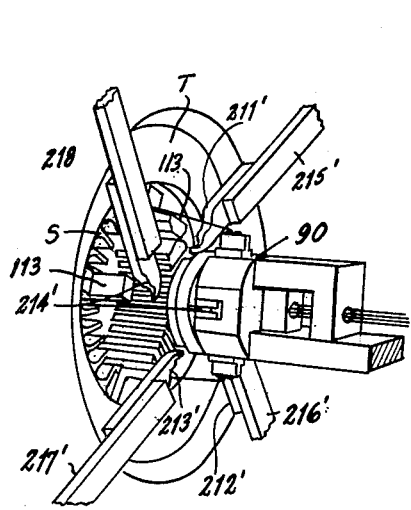
Figure 44:
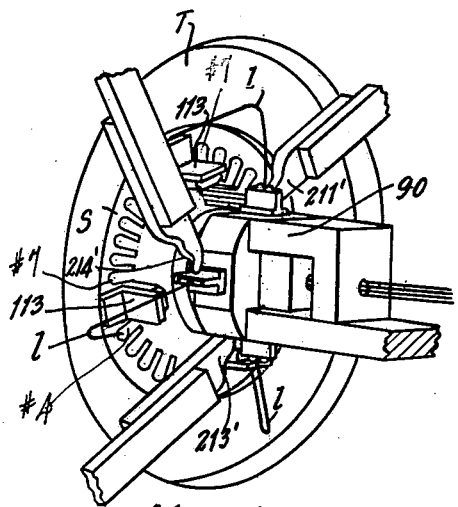
Figure 45:
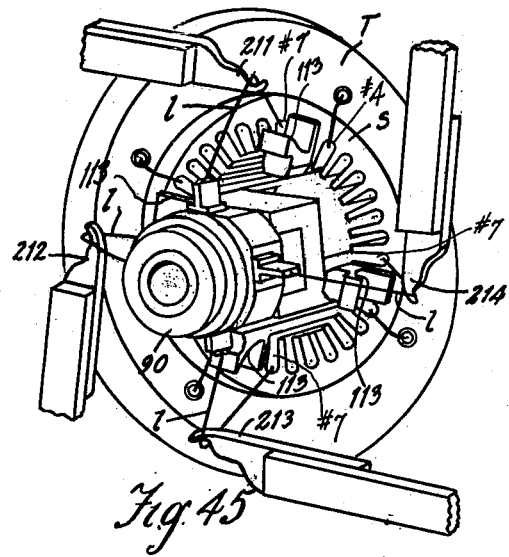
Figure 46:
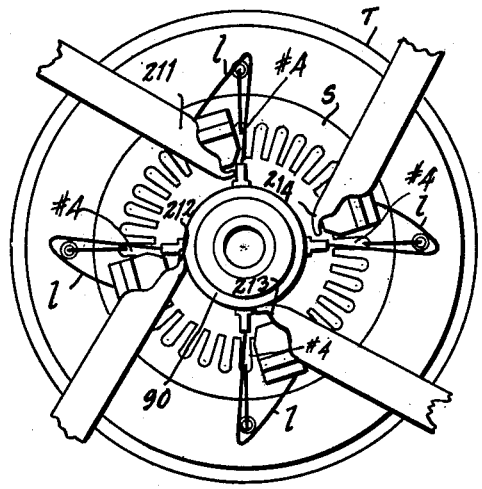

Referring to Figs. 13 and 40 through 46, the start end of the wires marked 1, 2, 3 and 4 (Fig. 40) are attached to the turret T. The shuttle 90 is in forward position in Fig. 40 and fingers (211—214 and 211'—214') are in. Fig. 41 shows that the shuttle has started to move back to place the wires in the #4 slots. Fig 42 shows the shuttle 90 at its back position and that the turret has begun to rotate counterclockwise in Figs. 42 and 43 and clockwise in Fig. 40. Before backward movement of the shuttle has ended (at 360°), the fingers have moved out at 345° and remain out as shown in Fig. 43 while the turret rotates. Fig. 44 shows that just before the shuttle starts forward the fingers move in to allow the loop wires to be caught by the loop positioning surfaces 113 of 110. Fig. 45 shows that the shuttle has moved forward and the fingers have caught the wires preparatory to a counterclockwise rotation of the turret which takes place after 185°. Fig. 46 shows that the turret has completed its counterclockwise movement and that the fingers have moved in so as to allow the loop wires to be caught by the positioning surfaces 113 of 110. The turret has now located the #4 slots of the stator in alignment with the shuttle plows. This cycle is repeated as before until the required number of coils are placed in the #4 and #7 slots. After that has been done cam block 331 (Fig. 31) engages the roller 331a to close switch 321 which results in downward movement of the stops 204 and 207 so that thereafter, when the cycle is repeated, the coils will be placed in the #3 and #8 slots. After the required number of coils have been placed in these slots, the cam 331 engages the roller 322a to close the switch 322 and the stops 303 and 308 drop so that thereafter, when the cycle is repeated, coils will be placed in the #2 and #9 slots. This will continue until the required number of coils have been wound in these slots and then the cam 331 will engage the roller 323a to close the switch 323 which results in dropping the stops 202 and 209 so that thereafter, when the cycle is repeated, the coils will be placed in the #1 and #1a slots. This will continue until the cam engages the roller 267a of the stop switch 267 and then all electromagnets are deenergized and the control apparatus is restored to normal status for beginning the next winding operation.

When the machine stops automatically at the end of the cycle, the shuttle is forward and the fingers are extended. The wires are cut and the shuttle is jogged back. The wound stator is unclamped thereby causing the start ends of the wires to be released so that the wound stator can be removed from the turret and be replaced by an empty core which is located in the turret by the turret key. The empty core is pushed against the back stop of the turret and the clamps are tightened. The machine is jogged forward to locate the shuttle in front and to locate the #4 slots in alignment with the shuttle. The start ends of the wires are anchored to the turret. The start button 261 is pressed and the cycle starts with a backward movement of the shuttle.

The machine does not stop the instant switch 267 is closed but coasts so that switch 267 is open again when the machine stops. Therefore the machine can be started again by closing switch 261. During the coasting period, relay 272, which is provided with a pneumatic time lag, remains closed so that relays 311, 312 and 313 remain energized and the stops 202—3—4—7—8—9 remain down; and therefore they do not interfere with coasting. By the time coasting has ended, relay 272 has opened so that relays 311, 312 and 313 are deenergized and valves 301, 302 and 303 are open and the stops are up.

Fig. 47 on same sheet with Fig. 2, shows various positions of a wire preceding and succeeding a back stroke of the shuttle (right to left). The forwardmost or front position of the shuttle is represented by three of its wire guiding rollers A1, B1 and C1 and other positions by the same letters with 2, 3 or 4 affixed. The dot-dash line $b1—d$ represents the portion of the wire extending from the roller at B1 to the point of anchorage on the turret T. The wire has this position only preceding the first back stroke of the shuttle. Preceding other back strokes of the shuttle, the wire extending from the stator to the roller at B1 is moved by a hooked finger mark $f$ in Fig. 47 to provide a cross-wire-loop forming portion $e—f—b1$ which the loop retainer 110 moves with during rotation of the turret. The finger $f$ releases the loop to allow it to engage the retainer 110 at $g$ when the shuttle moves left or back. As the shuttle moves back, the tension discs 50, 51 moving with it, pull the wire to take the slack out of the loop. The amount of back movement of the shuttle which takes place before the loop is drawn tight, depends on the amount of wire required for the cross-over between the slots which receive the wire. If the cross-over is long, the shuttle may have moved to position A2, B2, C2 to take up the slack or if the cross-over is relatively short, the shuttle may have moved to position A3, B3, C3. Assuming slack in the loop is taken up at the latter position, wire is pulled between the tension discs 50, 51. The amount of wire fed to the stator is the difference between length $e—c3$ and length $e—c4$. If the slack in the loop had been taken up when the shuttle had reached position A2, B2, C2, a greater amount of wire would have been pulled between the tension discs 50, 51 by the time the shuttle had reached position A4, B4, C4. By providing a tension device which moves with the shuttle, the wire is drawn taut during the back stroke as well as during the forward stroke. If the tension device were mounted on a fixed support, the wire would not be pulled taut on the back stroke as will be apparent from Fig. 47 in which $y,y$ represent fixed tension plates, and $x$ represents a point on the wire which remains fixed during back stroke of the shuttle. Wire portion $g—f—b1—a1—x$ is greater than wire portion $g—a2—x$ which is greater than wire portion $g—e—c3—a3—x$ which is greater than $g—e—c4—a4—x$. With a fixed tension device, the wire becomes increasingly slack during the back stroke of the shuttle. Therefore, during a forward stroke of the shuttle, the slack created during the preceding back stroke is taken up; and, while the wire is drawn taut, a considerable portion thereof is caused to rub on one side of the stator or on the loop retainer. The present machine is an improvement over machines known heretofore by providing for movement of the wire tension device with the shuttle.

While the embodiment of the present inven-

What is claimed is as follows:

1. A stator winding machine comprising a turret within which a stator core is secured, means capable of rotating the turret in either direction and including a reciprocating member having stop-engaging lugs extending therefrom, stops for variably limiting rotation of the turret due to engagement therewith by said lugs, a shuttle movable through the stator core when mounted within the turret and operable to place a wire in a stator core slot, means for moving the shuttle, a mechanism for operating said means in timed relation whereby a wire is located around certain groups of core teeth depending on the extent of movement of the turret, and means operated by said mechanism for causing, in predetermined sequence, the retraction of the stops in pairs from the path of movement of the lugs.

2. A machine according to claim 1 having fluid pressure means normally maintaining the stops in the paths of movement of the lugs against the action of gravity, the means which causes retraction of the stops being further characterized by the inclusion of valves which control the application of pressure fluid to the pressure-fluid means and electromagnets for controlling the valves and switches for controlling the electromagnets and a device operated by the mechanism for controlling the switches.

3. A stator winding machine comprising a turret within which a stator core is secured, means capable of rotating the turret in either direction and including a reciprocating member having stop-engaging lugs extending therefrom, stops for variably limiting rotation of the turret due to engagement therewith by said lugs, a shuttle movable through the stator core when mounted within the turret and operable to place a wire in a stator core slot, means for moving the shuttle, a mechanism for operating said means in timed relation whereby a wire is located around certain groups of core teeth depending on the extent of movement of the turret, a device for causing the machine to stop at the end of a winding cycle, and means operated by said mechanism for causing, in predetermined sequence, the retraction of the stops in pairs from the path of movement of the lugs and for operating the device which causes the machine to stop.

4. A machine according to claim 3 having fluid pressure means normally maintaining the stops in the paths of movement of the lugs against the action of gravity, the means which causes retraction of the stops being further characterized by the inclusion of valves which control the application of pressure fluid to the pressure-fluid means and electromagnets for controlling the valves and switches for controlling the electromagnets and a device operated by the mechanism for controlling the switches, and having means for stopping the machine at the end of a winding cycle and including an electric switch operated by said device.

5. A stator winding machine comprising a rotatable turret for receiving a stator core having cross-over loop retainers attached thereto, a shuttle movable through the turret for placing a wire in a certain core slot depending on the angular position of the turret and movable beyond the core to provide a cross-over loop-forming portion, fingers located adjacent both sides of the turret, each for engaging, when present, the said portion of the wire during rotation of the turret whereby it is held away from the core and retainers while the turret rotates to position another core slot in alignment with the shuttle and to locate a retainer in position to receive said portion when released by a finger, a wire tension device movable with the shuttle and having means for gripping the wire to cause it to move back with the shuttle or in a direction opposite to that in which the wire is pulled from a supply spool whereby, during backward as well as during forward movement of the shuttle, the cross-over portion and the portion extending therefrom which the shuttle locates in a slot, are drawn taut so that the cross-over portion is drawn toward the retainer, fluid pressure operated means for rotating the turret, fluid pressure operated means for moving the fingers, valves controlling said means, and a cam shaft and cams driven thereby respectively for moving the shuttle and for causing operation of said valves in timed relation.

6. A stator winding machine comprising a rotatable turret for receiving a stator core having cross-over loop retainers attached thereto, a shuttle movable through the turret for placing a wire in a certain core slot depending on the angular position of the turret and movable beyond the core to provide a cross-over loop-forming portion, means for engaging the said portion of the wire during rotation of the turret whereby it is held away from the core and retainers while the turret rotates to position another core slot in alignment with the shuttle and to locate a loop retainer in position to receive said portion when released by said means, a wire tension device movable with the shuttle and having means for gripping the wire to cause it to move back with the shuttle or in a direction opposite to that in which the wire is pulled from a supply spool whereby, during backward as well as during forward movement of the shuttle, the cross-over portion and the portion extending therefrom which the shuttle locates in a slot, are drawn taut so that the cross-over portion is drawn toward the retainer, a first shaft, devices operated thereby for causing the shuttle, turret and loop-engaging means to operate in timed relation, a second shaft driven by the first shaft a fraction of its rate depending on the number of turns of wire to be placed around stator core teeth, means variably limiting rotation of the turret and devices operated in sequence by the second shaft for controlling the turret rotation-limiting means.

7. A stator winding machine comprising a rotatable turret for receiving a stator core having cross-over loop retainers attached thereto, a shuttle movable through the turret for placing a wire in a certain core slot depending on the angular position of the turret and movable beyond the core to provide a cross-over loop-forming portion, fingers located adjacent both sides of the turret, each for engaging, when present, the said portion of the wire during rotation of the turret whereby it is held away from the core and retainers while the turret rotates to position another slot in alignment with the shuttle and to locate a retainer in position to receive said portion when released by a finger, a wire tension device movable with the shuttle and having means for gripping the wire to cause it to move back with the shuttle or in a direction opposite to that in which the wire is pulled from a supply spool whereby, during backward as well as during forward movement of the shuttle, the cross-over portion and the portion extending therefrom which the shuttle locates in a slot, are drawn taut so that the cross-over portion is drawn toward the retainer, fluid pressure operated means for rotating the turret, fluid pressure operated means for moving the fingers, valves controlling said means, a cam shaft and cams driven thereby respectively for moving the shuttle and for causing operation of said valves in timed relation, stops for variably limiting rotation of the turret, fluid pressure operated means for controlling the location of the stops, and valves for controlling the same, a timer shaft operated by the cam shaft at a fraction of its rate depending on the number of turns of wire to be placed around stator core teeth, and devices operated in sequence by the timer shaft for respectively controlling the last mentioned valves.

8. In the stator winding machine, the combination of a frame, a turret rotatably supported by the frame and adapted to support a stator core, means for securing the core to the turret, means carried by the turret for engaging the end of a wire to be placed in stator core slots, said means normally operating non-releasingly, and a mechanism responsive to operation of the first means to release the core to cause the second means to release its hold on the wire.

9. In the stator winding machine, the combination of a frame, a turret rotatably supported by the frame and adapted to support a stator core, means including a member rotatably supported by the core for securing the core to the turret, a plurality of devices carried by the turret each for engaging the end of a wire to be placed in stator core slots, said devices normally operating non-releasingly, a gear operated by the first means, and cam operated means operated by the gear when the first means is operated to release the core to cause each of the devices to release its hold on the wire.

10. In the stator winding machine, the combination of a frame, a turret rotatably supported by the frame and adapted to support a stator core, means for securing the core to the turret, means carried by the turret for engaging the end of a wire to be placed in stator core slots, said second means comprising an annular row of balls through which the wire end is placed, an internally tapered sleeve engaged by the balls and a spring for urging the balls wedgingly against the tapering inner surface of the sleeve to force the balls against the wire, and a mechanism responsive to operation of the first means to release the core to cause release of pressure by the spring upon the balls.

11. A stator winding machine comprising a table, a frame supported by and above the table, a turret rotatably supported by the frame and adapted to receive a stator core, a shuttle and shuttle-carrying bar supported by and above the table for reciprocation coaxially of the turret, a shaft parallel to said bar supported by the table, a drum cam driven by the shaft, a follower carried by said bar and cooperating with the cam, stops for variably limiting rotation of the turret, wire cross-over loop-engaging fingers supported by the frame, mechanisms respectively for controlling the stops, for rotating the turret and for moving the fingers and having servos located underneath and supported by the table, and devices under control by rotation of said shaft for controlling the servos.

12. A stator winding machine comprising a table, a frame supported by and above the table, a turret rotatably supported by the frame and adapted to receive a stator core, a shuttle and shuttle-carrying bar supported by and above the table for reciprocation coaxially of the turret, a shaft parallel to said bar supported by the table, a drum cam driven by the shaft, a follower carried by said bar and cooperating with the cam, stops for variably limiting rotation of the turret, wire cross-over-loop-engaging fingers supported by the frame, a mechanism for controlling the stops including fluid pressure operated servos supported by the table below the frame, a mechanism for rotating the turret and including a fluid pressure operated servo underneath the table adjacent one side of the first mentioned servos, a mechanism for moving the fingers and including a fluid pressure operated servo located underneath the table adjacent the other side of the first mentioned servos, and devices under control by said shaft for controlling said servos.

13. A stator winding machine comprising a table, a frame supported by and above the table, a turret rotatably supported by the frame and adapted to receive a stator core, a shuttle and shuttle-carrying bar supported by and above the table for reciprocation coaxially of the turret, a shaft parallel to said bar supported by the table, a drum cam driven by the shaft, a follower carried by said bar and cooperating with the cam, stops for variably limiting rotation of the turret, wire cross-over-loop-engaging fingers supported by the frame, a second cam driven by said shaft and means under control by said second cam for rotating the turret, a third cam driven by said shaft and means under control by said third cam for operating the fingers, a second shaft driven by the first shaft at a fraction of its speed depending on the number of turns of wire to be placed around stator core teeth, a timer cam operated by the second shaft, a mechanism for controlling the stops and under control by the timer cam.

14. A machine according to claim 13 in which the last named mechanism includes a plurality of servos respectively for controlling certain groups of stops and a plurality of devices respectively for controlling said servos and under control, sequentially, by said timer cam.

15. A machine according to claim 13 having means for disconnecting the timer cam from the second shaft and means for manually turning the timer cam to a starting position prior to reconnection with the second shaft.

ROBERT O. SCOFIELD.
HERBERT C. SCHRYVER.

REFERENCES CITED

The following references are of record in the file of this patent:

UNITED STATES PATENTS

| Number | Name | Date |
|---|---|---|
| 1,370,744 | Diehl | Mar. 8, 1921 |
| 1,595,396 | Herrick | Aug. 10, 1926 |
| 1,612,026 | Jannell | Dec. 28, 1926 |
| 2,197,117 | Ammann et al. | Apr. 16, 1940 |
| 2,232,262 | Parkinson | Feb. 18, 1941 |
| 2,304,520 | Wirtz et al. | Dec. 8, 1942 |